US011984004B2

(12) United States Patent
Claeys et al.

(10) Patent No.: US 11,984,004 B2
(45) Date of Patent: May 14, 2024

(54) SECURITY TAG FOR LOSS PREVENTION

(71) Applicant: Sensormatic Electronics, LLC, Boca Raton, FL (US)

(72) Inventors: Patrick S. Claeys, Weston, FL (US); Sergio M. Perez, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 71 days.

(21) Appl. No.: 17/482,049

(22) Filed: Sep. 22, 2021

(65) Prior Publication Data

US 2022/0092955 A1 Mar. 24, 2022

Related U.S. Application Data

(60) Provisional application No. 63/082,818, filed on Sep. 24, 2020.

(51) Int. Cl.
*G08B 13/24* (2006.01)

(52) U.S. Cl.
CPC ..... *G08B 13/2434* (2013.01); *G08B 13/2417* (2013.01); *G08B 13/2431* (2013.01); *G08B 13/2468* (2013.01)

(58) Field of Classification Search
CPC ............ E05B 73/0017; G08B 13/2434; G08B 13/2411; G08B 13/242; G08B 13/246
See application file for complete search history.

(56) References Cited

U.S. PATENT DOCUMENTS

| | | | | |
|---|---|---|---|---|
| 4,000,543 | A | 1/1977 | Paskert | |
| 7,474,222 | B2 * | 1/2009 | Yang | E05B 73/0017 70/57.1 |
| 2004/0233042 | A1 * | 11/2004 | Piccoli | G08B 13/2448 340/572.1 |
| 2009/0303049 | A1 * | 12/2009 | Greenlee | G06K 19/0702 340/572.1 |
| 2010/0134295 | A1 * | 6/2010 | Lax | G08B 13/2402 340/572.8 |
| 2010/0259392 | A1 * | 10/2010 | Chamandy | E05B 73/0017 340/572.8 |
| 2013/0199026 | A1 * | 8/2013 | Mazoki | G06K 19/07758 29/601 |
| 2018/0334836 | A1 * | 11/2018 | Miller | E05B 73/0017 |
| 2020/0224460 | A1 | 7/2020 | Miller et al. | |

* cited by examiner

*Primary Examiner* — Mirza F Alam
(74) *Attorney, Agent, or Firm* — ArentFox Schiff LLP

(57) ABSTRACT

The present disclosure relates to security tags for an electronic article surveillance system deployed in a retail environment. The security tag is a single piece security tag that comprises a tack housing and a tag housing connected by a beam. The beam is enabled to house one or more antenna elements that is electrically connected with one or more electronic components housed within the tag housing. Alternatively, one or more antenna elements can be housed within the tack housing, wherein engagement of the tack housing with the tag housing enables the one or more antenna elements to receive electrical signals from the one or more electronic components via a tack.

12 Claims, 4 Drawing Sheets

SECURITY TAG FOR LOSS PREVENTION

CROSS-REFERENCE TO RELATED APPLICATIONS

The current application claims priority to, and the benefit of, U.S. Provisional Application No. 63/082,818 filed on Sep. 24, 2020, entitled "A SECURITY TAG," the contents of which are hereby incorporated by reference in their entireties.

BACKGROUND

The present invention relates generally to security tags and more specifically to an apparatus for preventing the unauthorized removal of a security tag from the item to which it is attached.

Electronic article surveillance ("EAS") systems are generally known in the art for the prevention or deterrence of unauthorized removal of articles from a controlled area. In a typical surveillance system, EAS tags, markers and labels (collectively "security tags") are designed to interact with an electromagnetic field located at the exits of a controlled area, such as a retail store. These security tags are attached to the articles to be protected. If the security tag is brought into the electromagnetic field or "detection zone," the presence of the security tag is detected and appropriate action is initiated, such as generating an alarm. For authorized removal of the article, the security tag can be deactivated, removed or passed around the electromagnetic field to prevent detection by the EAS system.

With increase in the demand for automation, various electronic boards and active components are employed to enhance functionalities and capabilities of the security tags. However, trying to maintain a small size and housing multiple technologies such as Acousto-magnetic (AM), RFID, Near-field communication (NFC), batteries, Wi-Fi, inductive charging, etc. hinder the RF performance of security tag which is not desired.

Thus, there is a need for a security tag whose RF performance is not affected due to addition of electronic components, functionalities, and capabilities.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In one aspect, the present disclosure provides a security tag that is associated with an Electronic article surveillance (EAS) system. The security tag comprises a tack housing, a tag housing, and one or more antenna elements. The one or more antenna elements extend between the tack housing and the tag housing. In an embodiment, the one or more antenna elements extend over substantial length of the tag housing. The one or more antenna elements are electrically connected with one or more electrical components housed within the tag housing.

One aspect of the present disclosure includes a security tag comprising a tack housing, one or more antenna elements extending between the tack housing and a tag housing, and the tag housing having one or more electrical components, wherein at least a portion of the one or more antenna elements is disposed away from the one or more electrical components.

In some embodiments, one or more antenna elements are housed within a beam connecting the tag housing and the tack housing. In one embodiment, the beam may be made from plastic or any suitable polymer based material.

In some embodiments, the tack housing includes a tack and an actuator. The actuator may be enabled to displace the tack towards the tag housing for engaging the tack housing with the tag housing. In one embodiment, the actuator may be a telescopic actuator.

In another aspect of the present disclosure, a security tag comprising a tag housing and a tack housing enabled to house one or more antenna elements is disclosed. Preferably, the engagement of tack housing with the tag housing actuates the one or more antenna elements. In some embodiments, a tack extending from the tack housing engages with a locking arrangement of the tag housing. Preferably, electrical signals from the tag housing is provided to the one or more antenna elements via the tack.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

This disclosure relates to security tags for a retail environment. The security tags are radio frequency enabled tags affiliated with Electronic article surveillance (EAS) systems for preventing shoplifting from retail stores. The envisaged security tag is a single piece tag that provides improved RF performance as compared to conventional security tags. Additionally, the security tag of the present disclosure has capability of catering to technologies such as, but not limited to, Radio-frequency identification (RFID), Near-field communication (NFC), low energy Bluetooth (LEBT), and Wi-Fi. The design and construction of the security tag creates additional distance between the sensitive radiating portion, i.e., antenna element and on-board electrical components that may otherwise reduce range and sensitivity.

Figure 1:
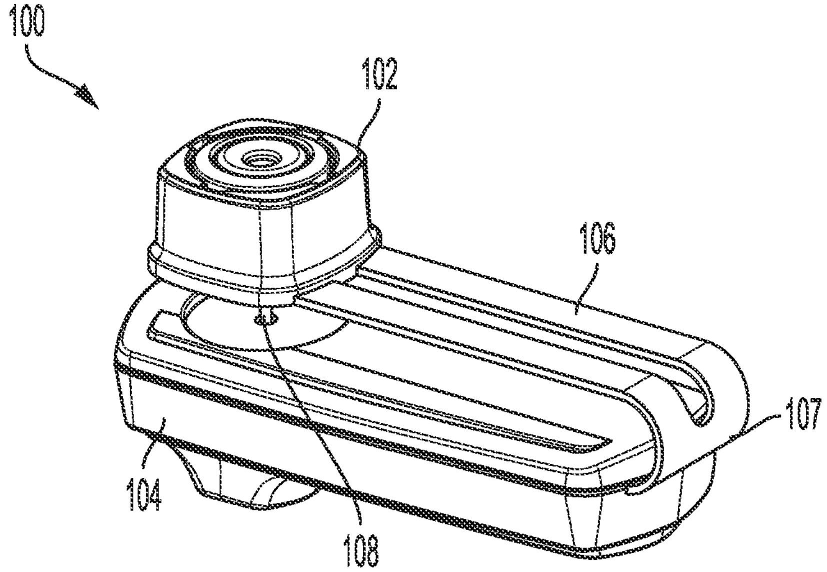
FIG. 1 is a schematic view of an example security tag, according to some embodiments of the present disclosure.
Figure 2:
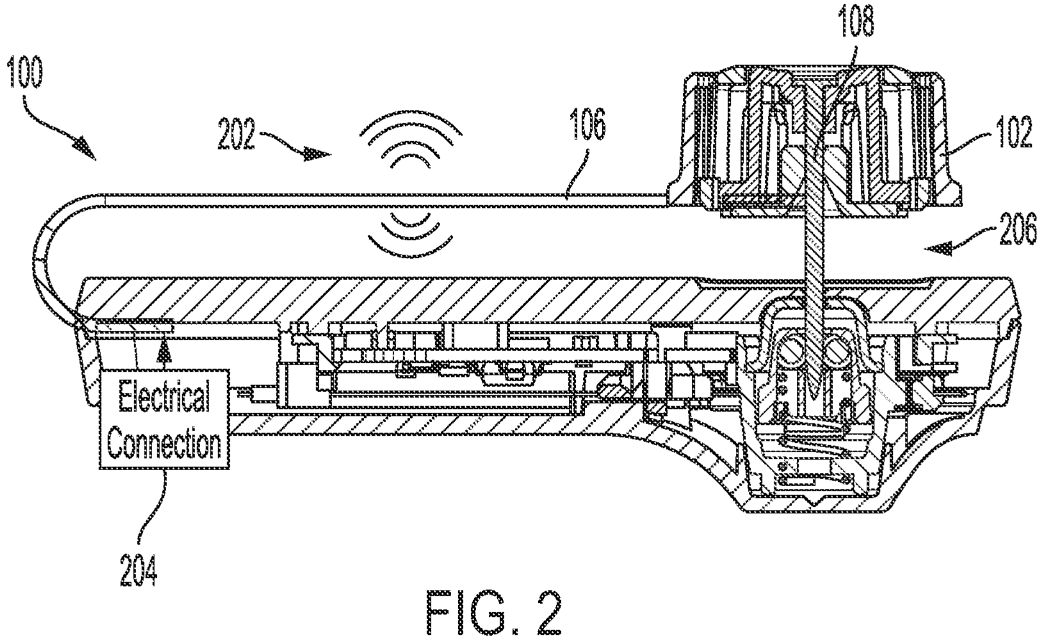
FIG. 2 is a cross-sectional view of the security tag of FIG. 1, according to some embodiments.

Referring now to FIG. 1 and FIG. 2, a security tag 100 for an Electronic article surveillance (EAS) system is depicted. The security tag 100 includes a tack housing 102, a tag housing 104, and a beam 106. In some embodiments, the tack housing 102 can be connected to the tag housing 104 by means of the beam 106.

The tack housing 102 can selectively engage and disengage from the tag housing 104 facilitating attachment or affixation of the security tag 100 to a desired article (not shown in figures). For example, the tack housing 102 may include a tack or pin 108 extending there from that can pierce a portion of the secured article. The tag housing 104 may receive a portion of the tack 108 protruding from the article, at which point the tack housing 102 becomes securely engaged with the tag housing 104 through mechanical, magnetic, and/or electrical mechanisms as known in the art. The subsequent, selective removal or disengagement of the tack housing 102 from the tag housing 104 may be limited to desired personnel having specialized tools or modalities for such disengagement, as also known in the art. In one non-limiting embodiment, the removal or disengagement of the tack housing 102 from the tag housing 104 can be performed by automated tag detachers, known in the art.

In some embodiments, the tack housing 102 includes an actuator (not shown in figures) that is coupled with the tack 108. In the disengaged state, the actuator extends out and away from the tack housing 102, and the tack 108 substantially resides inside the tack housing 102. When the actuator is depressed, the tack 108 is driven out of the tack housing 102, through an insert space 206, and into the tag housing 104. If a portion of the article resides in the insert space 206 then the tack 108 is driven through the article. Further, an operative free end of the tack 108 then engages by a securement member (e.g., a clamp) located in the tag housing 104. In this way, the security tag 100 is securely coupled to the article. For an example, the tack 108 is released from the securement member (e.g., a clamp) via the application of a magnetic field.

In some embodiments, the tag housing 104 is enabled to house a battery compartment (not shown in figures) and one or more electronic boards having multiple electronic components. The battery compartment may permit housing of one or more batteries. In some embodiments, the battery may be rechargeable and/or replaceable. The battery may be configured to electrically power the electronic components housed within the tag housing 104.

In one non-limiting embodiments, the security tag 100 may be provided with an auxiliary battery that may be secured in, on or about the tack housing 102. The utilization of auxiliary battery may provide a fail-safe mechanism, wherein the power from the auxiliary battery may be provided to the electronic components housed within the tag housing 104 while the tack housing 102 is engaged with the tag housing 104. This fail-safe mechanism may ensure operation of the security tag 100 in events when the batteries housed within the battery compartment of the tag housing 104 is damaged or removed to disable the security tag 100.

Still referring to FIG. 1, the beam 106 connected the tack housing 102 and the tag housing 104. In one example, the beam 106 extends from the tack housing 102 and terminates at an opening (not shown in figures) provided on the tag housing 104. In an embodiment, a terminating end 107 of the beam 106 facilitates attachment of the tack housing 102 with the tag housing 104. In one other example, the terminating end 107 of the beam 106 may be detachably connected to the tag housing 104. In yet another example, the terminating end 107 of the beam 106 may be fixedly connected to the tag housing 104. In one embodiment, the beam 106 may be a metal beam that is enabled to function as an antenna element. In one other embodiment, the beam 106 may be adapted to house the antenna element therewithin. In some embodiments, the antenna element may be attached to and extend along the surface of the beam 106.

In an embodiment, the antenna element may receive electrical signals from the one or electronic components housed within the tag housing 104 via electrical connection 204.

In certain aspects of the present disclosure, the electronic components may be configured to determine the state of the pin (e.g., engaged or disengaged) relative to the tag housing 104. For example, the electronic components and/or the antenna element may provide feedback to a scanner/reader system (not shown) when the pin 108 is being forcibly removed from the security tag 100. The pin 108 may be tracked electronically when the clutch (holding the pin in locked position) are engaged. An aspect of the present disclosure may alert an external security system and/or personnel to prevent possible losses.

In certain aspects of the present disclosure, the electronic components may transmit a signal to the scanner/reader system indicating that the pin 108 has not been disengaged and/or the security tag 100 has not been removed after an authorized purchase. In other words, a customer has already purchased a product associated with the security tag 100, but the pin 108 has not disengage to allow the customer use of the purchased product. As such, the system may transmit an alert to a customer assistant to assist with the removal of the security tag 100. An aspect of the system may be useful in a retail environment where customers perform self-check-out.

In another aspect of the present disclosure, the security tag 100 may include one or more RFID devices. The system may utilize the RFID devices, the electronic components, and/or the antenna element to locate the security tag 100 (and therefore the product that the security tag 100 is attached to). In one example, misplaced merchandise, lost items, and/or items left in the fitting room may be tracked and/or located by the system.

The positioning and/or placement of the antenna element away from the electronic components of the tag housing 104 enhances the performance of the security tag 100. For example, the placing the antenna element away from the electronic components may reduce cross-talk and/or interference between the antenna element and the electronic components. In some examples, the antenna element may be placed in or along the beam 106. At least a portion of the antenna element may be placed 0.5 centimeter (cm), 1 cm, 2 cm, 5 cm, or more away from the electronic components. Specifically, RF performance, i.e., range and directionality of the security tag 100 is enhanced. As depicted from FIG. 2, the antenna element of the security tag 100 has multi-direction radiation pattern 202.

In one non-limiting embodiment, the metal beam may have few degrees of flexibility, and may also function as the antenna element.

Figure 3:
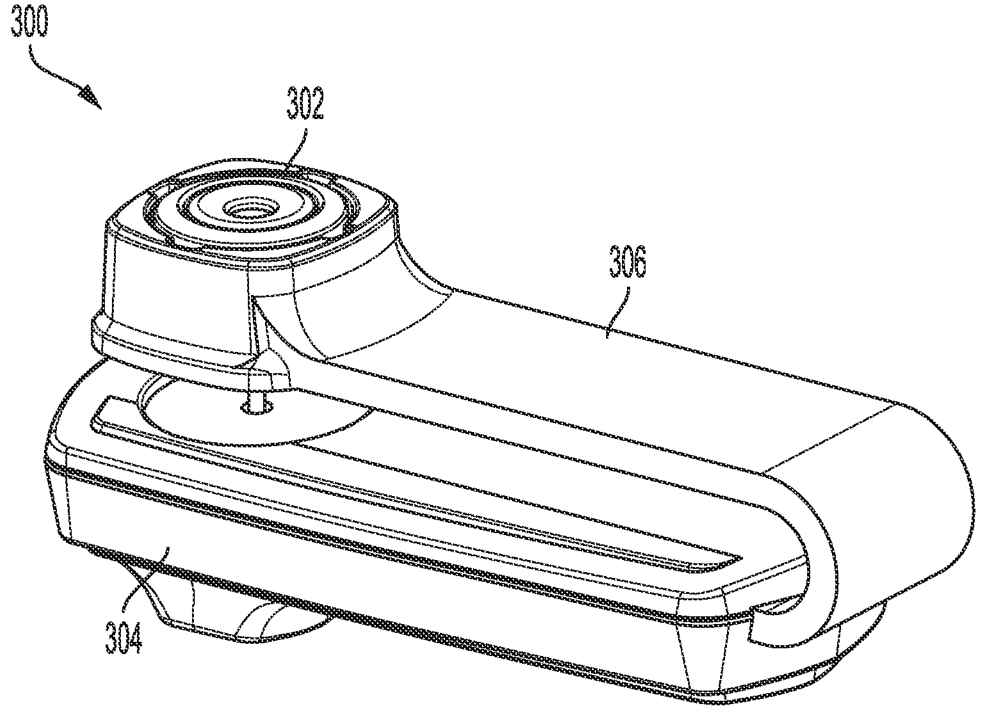
FIG. 3 is a schematic view of another example security tag in accordance with some embodiments of the present disclosure.
Figure 4:
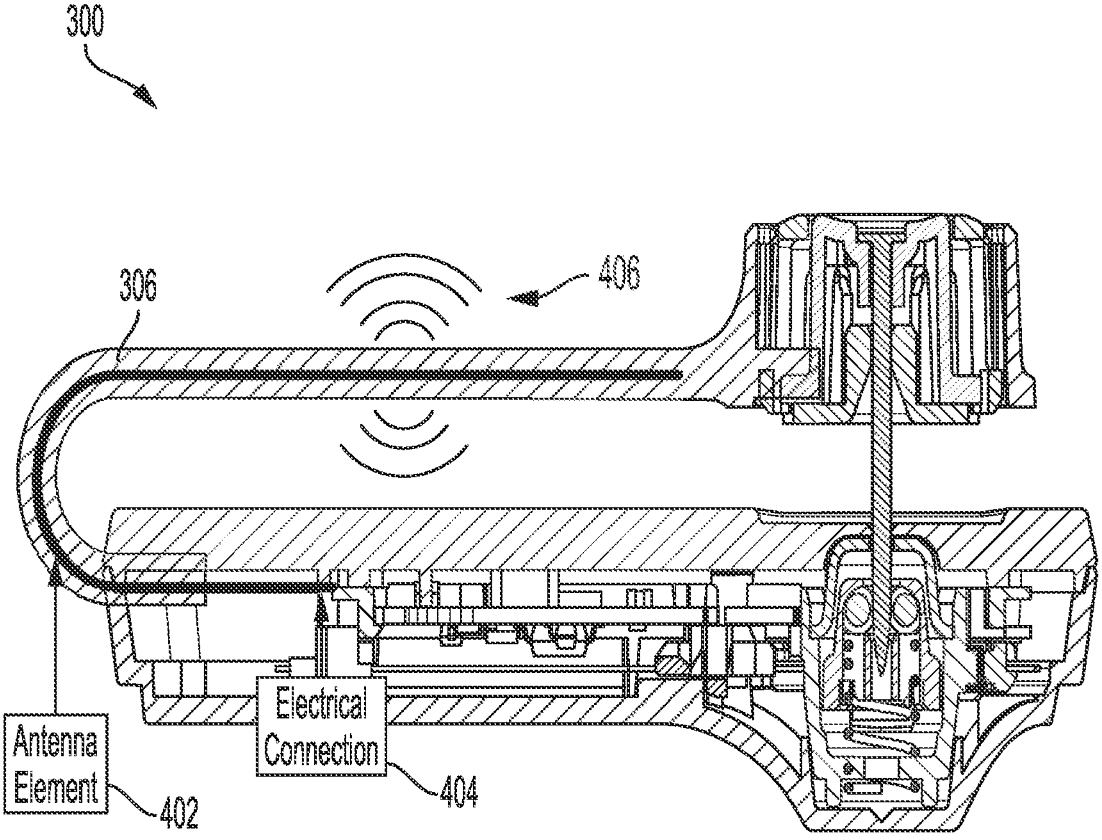
FIG. 4 is a cross-sectional view of the security tag of FIG. 3, according to some embodiments.

In one other implementation, referring to FIG. 3 and FIG. 4, a security tag 300 is envisaged. The security tag 300 comprises a tack housing 302, a tag housing 304, and a beam 306. Specifically, the beam 306 is made from plastic or any suitable polymer based material. The beam 306 extends between the tag housing 304 and the tack housing 302.

As shown in FIG. 4, one or more antenna elements 402 can be substantially housed within the beam 306, and can have electrical connection 404 with the one or more electronic components housed within the tag housing 304. The positioning of the antenna element 402 within the beam 306 facilitates multi-directional radiation pattern 406.

In an embodiment, the security tag 400, similar to the security tag 100, creates additional distance between the radiating portion, i.e., antenna element 402, and the electronic components that may otherwise reduce range and sensitivity of the antenna element 402.

Figure 5:
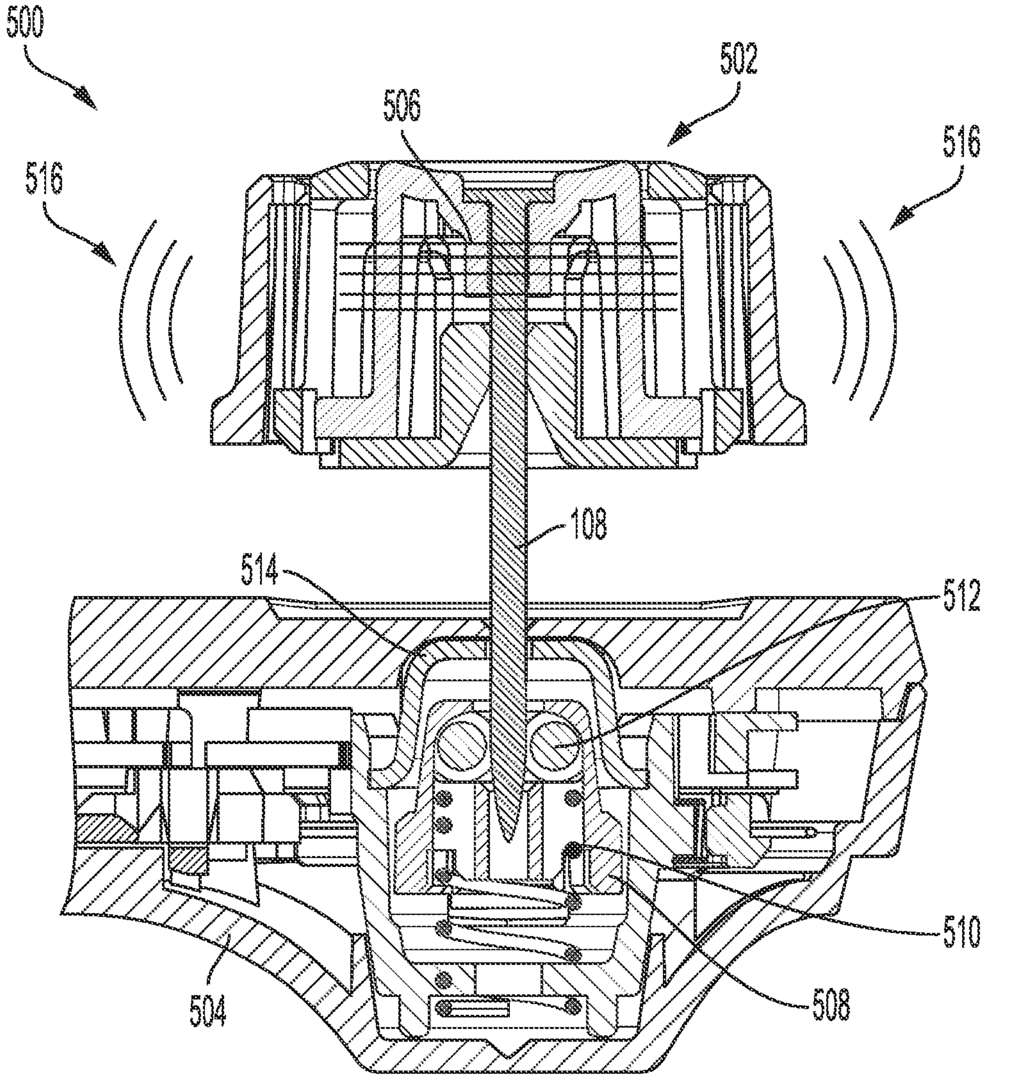
FIG. 5 is a cross-sectional view of yet another example security tag in accordance with some embodiments of the present disclosure.

Referring now to FIG. 5, the present disclosure further envisages a security tag 500. The security tag 500 incudes a tack housing 502 and a tag housing 504. The tack housing 502 can selectively engage and disengage from the tag housing 504 facilitating attachment or affixation of the security tag 500 to a desired article (not shown in figures). For example, the tack housing 502 may include a tack or pin 108 extending there from that can pierce the secured article. In an embodiment, the tack 108 is made of a metal. The tag housing 504 may receive a portion of the tack 108 protruding from the article, at which point the tack housing 502 becomes securely engaged with the tag housing 504 through mechanical, magnetic, and/or electrical mechanisms as known in the art.

In some embodiments, the tack housing 502 includes an actuator (not shown in figures) that is coupled with the tack 108. In disengaged state, the actuator extends out and away from the tack housing 502, and the tack 108 substantially resides inside the tack housing 502. When the actuator is depressed, the tack 108 is driven out of the tack housing 502 into the tag housing 504. Further, an operative free end of the tack 108 then engages by a locking arrangement located in the tag housing 504. In this way, the security tag 500 is securely coupled to the article. For an example, the locking arrangement can employ a three ball clutch. In one non-limiting embodiment, the actuator may be a telescopic actuator.

In this implementation, the tack housing 502 is adapted to house one or more antenna elements 506. In an embodiment, the antenna element 506 can be in form of, but not limited to, flex and coiled wire. Further, the tag housing 504 comprises a metal plunger 508, one or more metal spring 510, metal balls 512, and a metal bell 514. The engagement of the tack housing 502 with the tag housing 504 create a closed loop circuit for passage of electrical signals/RF flow.

In one example, the electrical signal/RF flow from the tag housing 504 towards the antenna element 506 placed within the tack housing 502 is via the metal plunger 508, one or more metal spring 510, one or more metal balls 512, and the tack 108.

In one other example, the electrical/RF flow from the tag housing 504 towards the antenna element 506 placed within the tack housing 502 is via the metal bell 514 and the tack 108.

The antenna element 506 provides multi-directional radiation pattern 516 as shown in FIG. 5.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A security tag comprising:

a tack housing;

a tag housing;

an elongated beam extending laterally along the tag housing and coupling with the tack housing and the tag housing, wherein the elongated beam is longer than a width of the tack housing;

one or more antenna elements extending through the elongated beam between the tack housing and the tag housing; and the tag housing having one or more electrical components, wherein at least a portion of the one or more antenna elements is disposed away from the one or more electrical components.

2. The security tag of claim 1, wherein the one or more antenna elements are electrically connected with the one or more electrical components housed within the tag housing.

3. The security tag of claim 1, wherein the elongated beam is made from plastic.

4. The security tag of claim 1, wherein the tack housing comprises:

a tack; and an actuator enabled to displace the tack towards the tag housing.

5. The security tag of claim 4, wherein the actuator is a telescopic actuator.

6. The security tag of claim 4, wherein the one or more electrical components are configured to detect whether the tack is in an engaged position or a disengaged position.

7. The security tag of claim 6, wherein the one or more electrical components are further configured to transmit an indication signal, to an external system, indicating whether the tack is in the engaged position or the disengaged position.

8. The security tag of claim 1, wherein the tag housing comprises of one or more of a primary battery compartment and an auxiliary battery compartment.

9. The security tag of claim 1, wherein the at least a portion of the one or more antenna elements is disposed more than 1 centimeter away from the one or more electrical components.

10. The security tag of claim 1, further comprising a radio frequency identification (RFID) device configured to receive and backscatter radio frequency (RF) signals.

11. The security tag of claim 1, further comprises a fail-safe mechanism including an auxiliary battery configured to provide electrical energy in response to a primary battery being disabled.

12. The security tag of claim 1, wherein the at least a portion of the one or more antenna elements is placed 5 centimeters or more from the one or more electrical components.

* * * * *